(12) United States Patent
Luke et al.

(10) Patent No.: US 10,981,489 B2
(45) Date of Patent: Apr. 20, 2021

(54) CAM BUCKLE TIE-DOWN

(71) Applicant: HAMPTON PRODUCTS INTERNATIONAL CORPORATION, Foothill Ranch, CA (US)

(72) Inventors: Duane J. Luke, Anaheim Hills, CA (US); Jose A. Figueroa, Eastvale, CA (US)

(73) Assignee: HAMPTON PRODUCTS INTERNATIONAL CORPORATION, Foothill Ranch, CA (US)

( * ) Notice: Subject to any disclaimer, the term of this patent is extended or adjusted under 35 U.S.C. 154(b) by 0 days.

(21) Appl. No.: 16/727,636

(22) Filed: Dec. 26, 2019

(65) Prior Publication Data

US 2020/0207251 A1 Jul. 2, 2020

Related U.S. Application Data

(60) Provisional application No. 62/785,066, filed on Dec. 26, 2018.

(51) Int. Cl.
*B60P 7/08* (2006.01)
*A44B 11/02* (2006.01)

(52) U.S. Cl.
CPC ............ *B60P 7/0823* (2013.01); *A44B 11/02* (2013.01)

(58) Field of Classification Search
CPC ....... B60P 7/083; B60P 7/0823; B60P 7/0846; B60P 7/0861; B60P 7/0838; B60P 7/0853; B60P 7/08; B60P 3/079; A44B 11/125

USPC ......... 410/100, 103, 97, 98, 101, 96, 9, 115, 410/120; 254/218, 223, 217, 247, 106, 254/266

See application file for complete search history.

(56) References Cited

U.S. PATENT DOCUMENTS

| 5,893,199 | A  | * | 4/1999 | Anscher | ............... | A44B 11/006 24/170 |
| 2008/0273937 | A1 | * | 11/2008 | Hanson | ................... | B60P 7/083 410/100 |
| 2012/0074186 | A1 | * | 3/2012 | Hung | ....................... | A45F 3/14 224/254 |

(Continued)

OTHER PUBLICATIONS

Digital photographs of prior art Cam Buckle Tie-Down sold by the Applicant (3 pages).

*Primary Examiner* — D Glenn Dayoan
*Assistant Examiner* — Sunsurraye Westbrook

(57) ABSTRACT

A cam buckle assembly, for use with a length of webbing in a tiedown assembly and configured for longitudinal passage therethrough of the webbing, includes a frame having a base; a cam pivotably coupled to the frame between a web-gripping portion and an actuation portion for movement between a secured position in which the web-gripping portion is positioned to grip the webbing against the base of the frame, and a release position in which the web-gripping portion is positioned to release the webbing from the base of the frame; a longitudinal cam groove in the gripping portion of the cam; and a plurality of gripping structures on the web-gripping portion of the cam, extending laterally on opposite sides of the cam groove. The base of the frame may advantageously have a longitudinal frame groove laterally aligned with the cam groove.

7 Claims, 4 Drawing Sheets

(56) References Cited

U.S. PATENT DOCUMENTS

| | | | |
|---|---|---|---|
| 2014/0055120 A1* | 2/2014 | Kubota | H02M 3/158 323/311 |
| 2014/0265286 A1* | 9/2014 | Srugis | B60R 22/22 280/801.1 |
| 2015/0016916 A1* | 1/2015 | Dickey | B60P 7/08 410/100 |
| 2015/0291079 A1* | 10/2015 | Wright | B60P 7/0869 410/100 |
| 2016/0061672 A1* | 3/2016 | Ohtsuka | G01D 5/35303 356/35.5 |
| 2018/0312100 A1* | 11/2018 | Durand | B60P 7/0823 |

* cited by examiner

CAM BUCKLE TIE-DOWN

CROSS REFERENCE TO RELATED APPLICATION

This application claims priority, under 35 U.S.C. 119(e), from U.S. Provisional Application No. 62/785,066, filed Dec. 26, 2018, the disclosure of which is incorporated herein by reference in its entirety.

FEDERALLY SPONSORED RESEARCH OR DEVELOPMENT

Not applicable

FIELD OF THE ART

The present disclosure relates generally to fastening devices, and more particularly, to a cam buckle assembly for webbing with an uneven surface.

BACKGROUND

Tie-down hardware featuring cam buckles or ratchet mechanisms is commonly used with webbing to strap down and secure cargo or objects in place. This is especially important when transporting cargo. A typical cam buckle tie-down assembly typically comprises a cam buckle assembly, a first connector (e.g., hook) tethered to one end of the webbing, with a free end of the webbing passing through the cam buckle assembly, and a second connector (e.g., hook) attached to the other end of the webbing.

The typical cam buckle assembly contains two major components: a frame and a cam or jaw pivotably coupled to the frame. The free end of the webbing passes through a clearance between the frame and the cam. The rotation of the cam relative to the frame changes the clearance; rotation in one direction reduces the clearance, and rotation in the other direction increases the clearance. The first and second connectors can be removably fixed to anchors on, for example, a truck bed. To secure the cargo items to the truck bed, the webbing is placed over the cargo items to be secured, and the free end of the webbing is pulled in a "tightening" direction through the cam buckle assembly to remove the slack in the webbing and create tension in the webbing to adequately strap the cargo items down to the truck bed. The harder the operator pulls on the webbing, the greater the tension. The cam, through rotation, applies a force to the webbing to "bite" down on the webbing and clamp it against the frame. The cam typically has a knurled, toothed, or serrated cam-gripping surface facing the webbing to help bite down and grip the webbing. Because of the contact between the cam-gripping surface and the webbing, the tension in the webbing further pulls the cam to rotate in the direction that decreases the clearance between the cam and the frame, thereby increasing the strength of the bite on the webbing. Thus, it is the tension in the webbing that causes the cam to bite on the webbing against the frame and maintain the strength of the bite to keep the webbing in tension. The tension in the webbing can be decreased and removed by manually pushing an opposite end of the cam, which causes the cam to rotate in the direction that increases the clearance between the cam and the frame, thereby removing the cam's grip on the webbing, allowing the operator to pull the webbing in a "release" direction, which is opposite the tightening direction, and create slack so that the cargo items can be removed.

The addition of an embedded, longitudinally-oriented metal cable to the webbing provides an added theft deterrent feature. The metal cable makes cutting the webbing more challenging for a would-be thief to access the cargo. However, the presence of the metal cable in the webbing presents an uneven webbing surface that reduces the effective area of the webbing that is clamped between the cam and the jaw, thereby potentially hindering the cam from adequately biting down on the webbing, thus reducing the grip strength on the webbing provided by the cam and the frame in the secured position of the cam. Without sufficient grip on the webbing in the secured position of the cam, the webbing may be inadvertently loosened in the release direction after overcoming the grip strength.

SUMMARY

In accordance with aspects of this disclosure, a cam buckle assembly is provided in which at least one of the jaw (or cam) and the frame is configured to maximize the surface area of the webbing that is contacted by, and thus captured between, the cam and the frame when the cam buckle assembly is in the secured position, i.e., the position in which the cam and the frame clamp the webbing so as to allow the webbing to be pulled through the cam buckle assembly only in a tightening direction, but without allowing movement of the webbing through the cam buckle assembly in a loosening or release direction. The novel configuration of the cam and/or the frame maximizes the contact area on the webbing, particularly when the webbing includes a central, longitudinal, internal metal cable that is accommodated within a channel that creates a ridge on one or both the upper and lower surfaces of the webbing.

In accordance with the aforesaid aspects, a cam buckle assembly, for use in a cam buckle tiedown assembly, is configured for passage of a length of webbing longitudinally therethrough between a pivotable jaw or cam and a frame, the cam buckle assembly including at least one of a longitudinal cam groove and a longitudinal frame groove, each of which is located and dimensioned to accommodate a longitudinal ridge in the webbing that is formed by a channel through which a reinforcing metal cable passes. Thus, a cam groove is provided in the cam or jaw, and/or a frame groove is provided in the frame; if both grooves are provided, they are in lateral alignment with (i.e., directly opposite) each other.

More specifically, in accordance with aspects of the disclosure, a cam buckle assembly is disclosed for use with a length of webbing in a tiedown assembly and configured for passage therethrough of the webbing in a longitudinal direction, wherein the cam buckle assembly comprises a frame having a base; a cam pivotably coupled to the frame between a web-gripping portion and an actuation portion for movement between a secured position in which the web-gripping portion is positioned to grip the webbing against the base of the frame, and a release position in which the web-gripping portion is positioned to release the webbing from the base of the frame; a cam groove provided in the gripping portion of the cam and oriented along the longitudinal direction; and a plurality of gripping structures on the web-gripping portion of the cam, extending laterally on opposite sides of the cam groove. In some embodiments, the cam buckle assembly also includes, in the frame, a longitudinal frame groove laterally aligned with the cam groove. In some embodiments, the cam is configured without a groove, and only a frame groove is provided.

In accordance with another aspect of the disclosure, a cam buckle tiedown assembly comprises a length of webbing having a metal cable extending longitudinally therethrough, the webbing having first and second surfaces, the cable being accommodated in a longitudinal channel through the webbing and defining a longitudinal ridge on at least one of the first and second surfaces; and a cam buckle assembly configured for passage therethrough of the webbing in a longitudinal direction, wherein the cam buckle assembly comprising a frame having a base; a cam pivotably coupled to the frame between a web-gripping portion and an actuation portion for movement between a secured position in which the web-gripping portion is positioned to grip the webbing against the base of the frame, and a release position in which the web-gripping portion is positioned to release the webbing from the base of the frame; and a longitudinal groove provided in at least one of the gripping portion of the cam and the base of the frame, each longitudinal groove being configured to receive the longitudinal ridge on an adjacent one of the first and second webbing surfaces.

DETAILED DESCRIPTION

Figure 1:
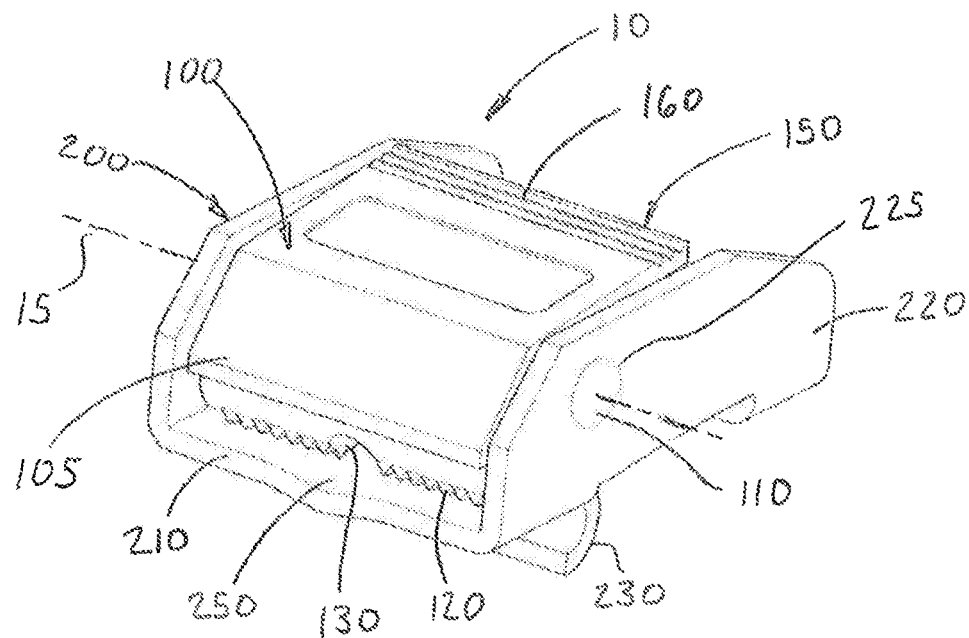
FIG. 1 is a top and front perspective view of an embodiment of a cam buckle assembly in a secure position.
Figure 2:
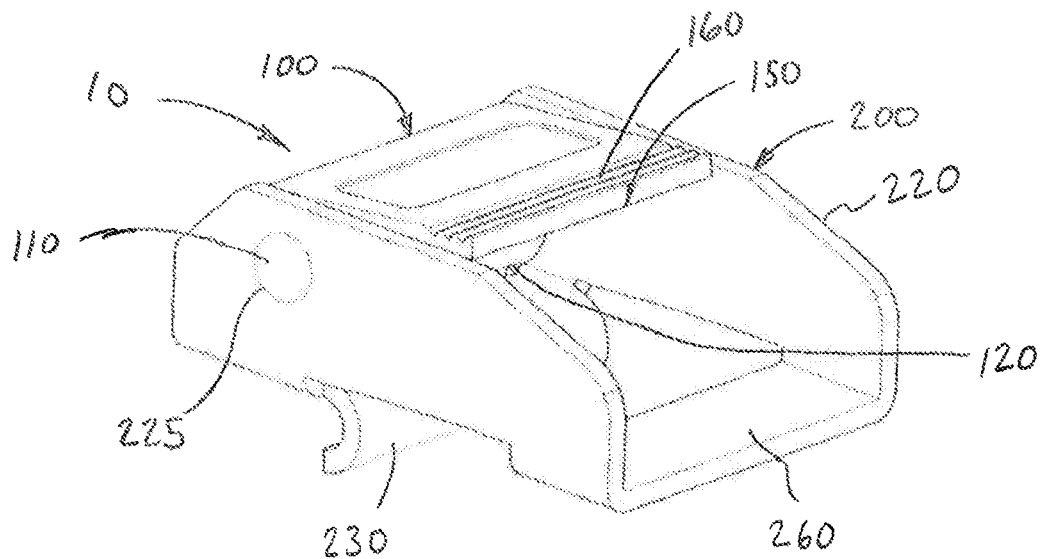
FIG. 2 is a top and rear perspective view of the cam buckle assembly of FIG. 1 in the secure position.

The detailed description set forth below in connection with the appended drawings is intended as a description of the embodiments of a cam buckle tie-down assembly. It is not intended to represent the only forms in which the present components, assemblies, and method may be constructed or utilized. The description sets forth the features and the steps for constructing and using the embodiments of the present components, assemblies, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Referring to FIGS. 1-6, an embodiment of a cam buckle assembly 10 for a cam buckle tie-down is shown. The cam buckle assembly 10 comprises a cam 100 or jaw pivotably coupled to a frame 200 along a cam pivot axis 15. The cam 100 and the frame 200 can be made of a durable hard material, such as a metal or a hard plastic. The cam 100 can be pivotally supported by means of pivot pins integrally formed with the cam 100 and extending outwardly from sides of the cam 100 into corresponding apertures 225 in opposite sidewalls 220 of the frame 200. The pivot pins may be provided at the opposite ends of a pivot rod or shaft 110 extending through a bore (not shown) of the cam 100 and the corresponding apertures 225 in the opposite sidewalls 220 of the frame 200. The cam 100 may pivot between a secure position (FIGS. 1-4), in which the clearance between the cam 100 and the frame 200 is reduced, and a release position (FIGS. 5 and 6), in which the clearance between the cam 100 and the frame 200 is enlarged. As discussed below, with reference to FIGS. 3, 4, and 6, the cam buckle assembly 10 is employed with a length of webbing 50 that advantageously has a connector (not shown) at each end (as is conventional) to form a cam buckle tiedown assembly, in which a length of webbing is passed longitudinally through the cam buckle assembly between the frame 200 and the cam 100.

Figure 3:
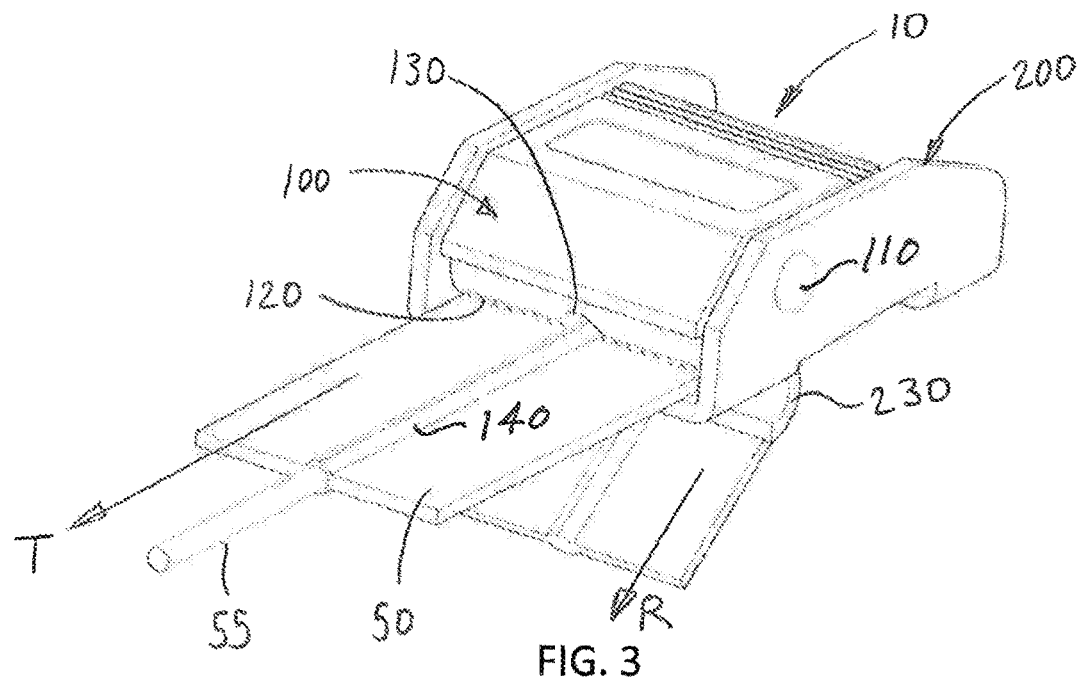
FIG. 3 is a top and front perspective view of the cam buckle assembly of FIG. 1 in the secure position, engaged with a length of webbing.
Figure 4:
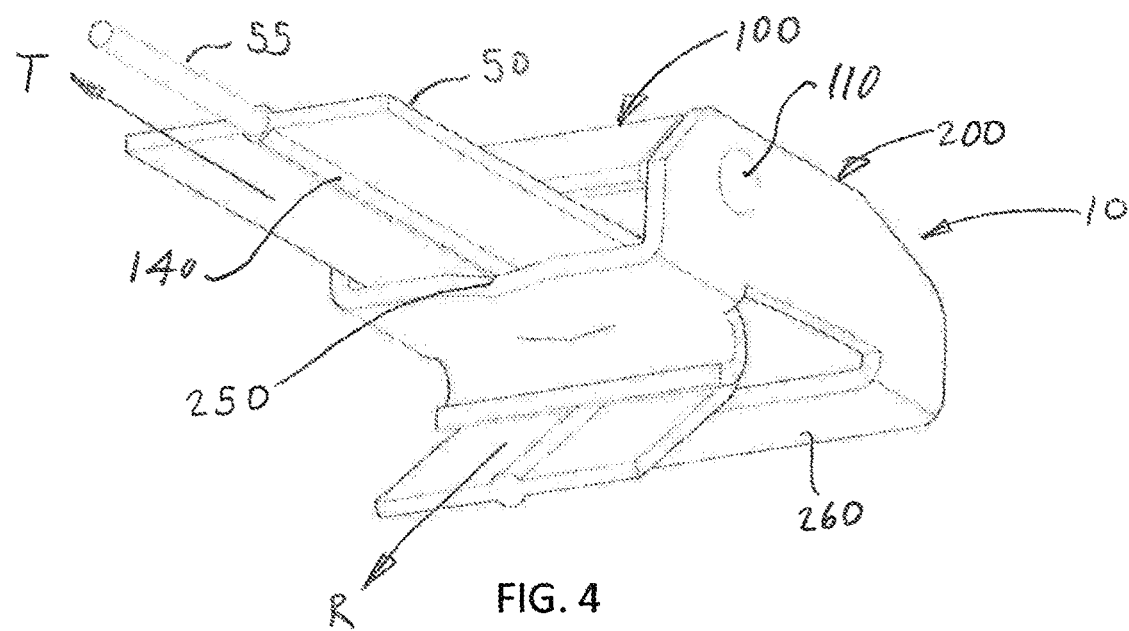
FIG. 4 is a bottom and rear perspective view of the cam buckle assembly of FIG. 1 in the secure position, engaged with the length of webbing.
Figure 5:
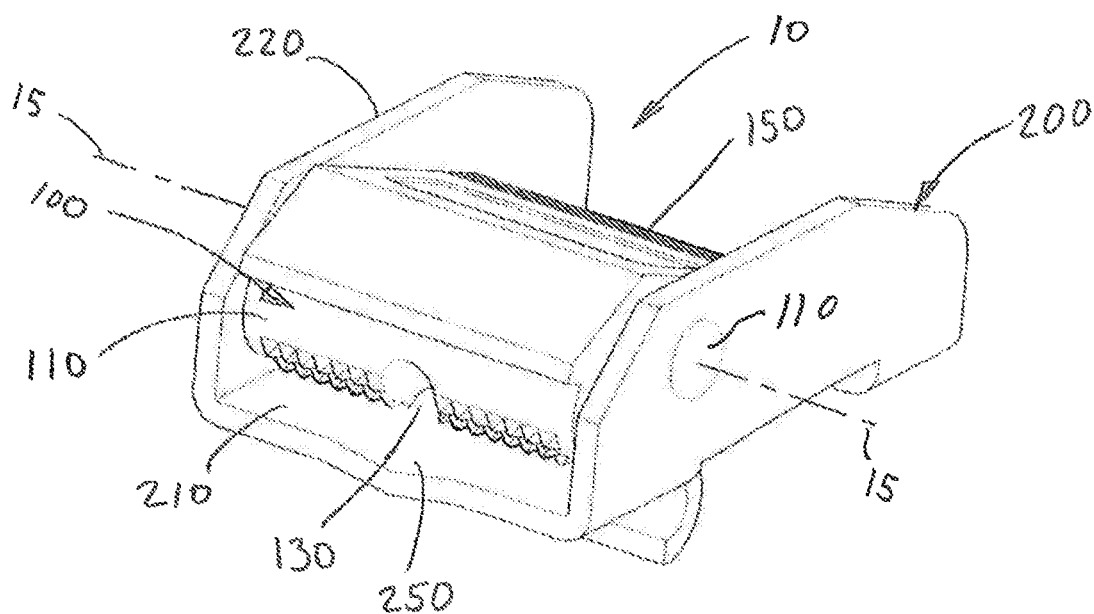
FIG. 5 is a top and front perspective view of the cam buckle assembly of FIG. 1 in a release position.
Figure 6:
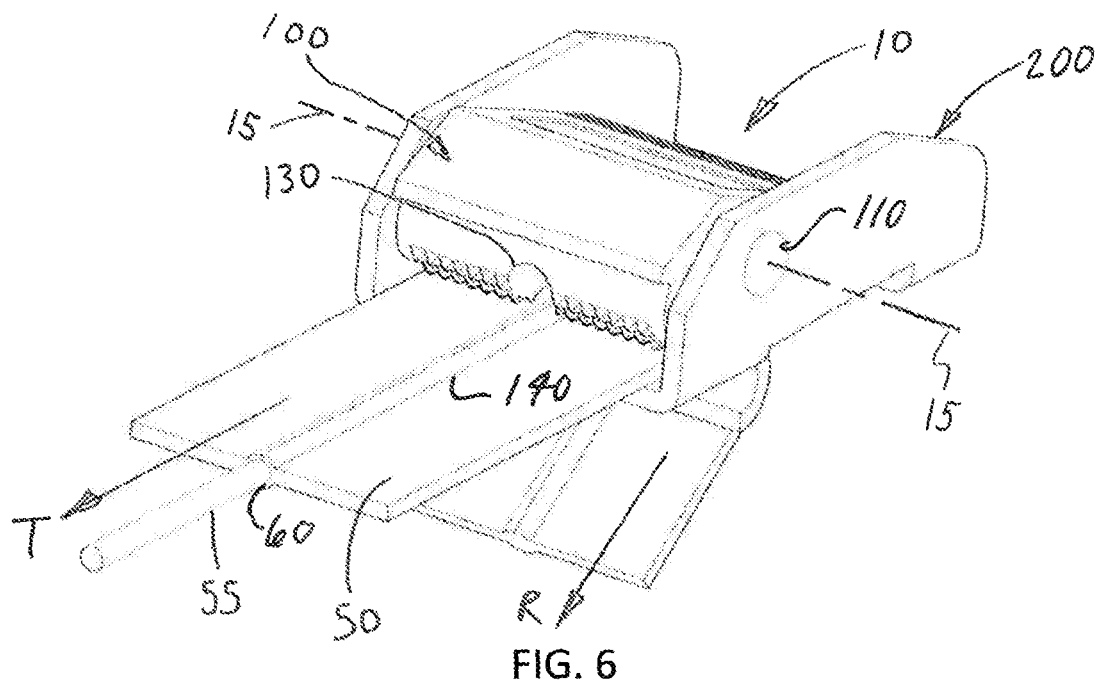
FIG. 6 is a perspective view similar to that of FIG. 5, with the cam buckle assembly in the release position, as installed on a length of webbing.

In the secure position, as shown in FIGS. 3 and 4, the webbing 50 is captured or clamped between the cam 100 and the frame 200. In the secure position, the webbing 50 is freely movable through the cam buckle assembly by being pulled in a tightening direction T, and its movement in the opposite, release direction R is limited or restricted by the clamping action of the cam buckle assembly. Thus, with a connector (not shown) at one end of the webbing secured to a structure (e.g., a truck bed or the like), the opposite, loose end (not shown) of the webbing 50 may be manually pulled to increase the tension in the webbing, while the engagement of the cam buckle assembly 10 with the webbing maintains the increased tension in the webbing. More specifically, in the secure position, the cam 100 bites or grips the webbing 50 and clamps it against the frame 200, with the tension that can be applied to the free end of the webbing depending on strength of the bite or grip, as discussed in further detail below. In the release position (FIGS. 5 and 6), the clamping action of the cam 100 and the frame 200 on the webbing is released, so that the webbing is freely movable in either the tightening direction T or the release direction R. Moving the webbing in the release direction by a sufficient amount allows the tie down assembly to be loosened and, if desired, from the structure to which it was secured.

The cam buckle assembly 10 may further comprise a biasing element such as a torsion spring (not shown) sleeved over the shaft 110 with one end of the torsion spring pressing against the cam 100 and the other end of the torsion spring pressing against the frame 200 to bias the cam 100 towards the secure position. The torsion spring, if used, would also ensure that when there is no tension on the webbing, the cam buckle assembly would provide at least a minimal amount of grip on the webbing 50.

The cam 100 comprises a web-gripping portion 105 at one end (e.g., the front) of the cam 100, and an actuation portion 150 at the opposite end (e.g., the rear) of the cam 100. The actuation portion 150 is positioned and configured to be pushed downward by an operator to rotate the cam 100 on the pivot shaft 110 towards the release position, thereby releasing the tension in the webbing and allowing the webbing to be pulled in the release direction R.

As best shown in FIG. 4, a curved tailpiece 230 may extend from the base 210 of the frame 200. The tailpiece 230 is advantageously configured to allow the portion of the webbing 50 passing through the cam buckle assembly to turn back towards the main length of the webbing 50. The tailpiece 230 may be curved and have a radius of curvature appropriate to accommodate the desired bend radius of the webbing 50 including the cable 55.

The web-gripping portion 105 has a gripping surface that may advantageously be formed as a plurality of gripping structures, such as teeth 120, configured and located to dig into and grip the webbing 50, and a cam groove 130 extending through the web-gripping portion in a longitudinal direction of travel of the webbing. The cam groove 130 separates the teeth 120 into at least two separate regions on opposite sides of the cam groove 130. The cam groove 130 accommodates a longitudinal central ridge 140 formed on one or both surfaces of the webbing 50 by a central longitudinal channel 60 (FIG. 6) that accommodates a metal (e.g., steel) cable 55 running longitudinally through the center of the webbing. More specifically, the cam groove 130 allows the teeth 120 of the cam 100 to contact and bite into the flat portions of the webbing 50 on either lateral side of the central ridge 140, resulting in a greater contact area than would be provided without the cam groove 130. For example, without the cam groove 130, the teeth 120 would contact and grip only the ridge portion 140 of the webbing covering the cable 55, which is a much smaller contact area than the portions of the webbing alongside of the ridge 140. A larger contact area naturally results in a greater grip strength of the webbing 50, thus allowing a greater tension of the webbing 50. The shape of the cam groove 130 can be semi-circular, U-shaped, V-shaped, or any other shape, provided there is sufficient clearance of the cable 55 and the ridge 140 covering the cable 55 when the cam 100 is in the secure position. The shape of the cam 100 and the teeth 120, and the orientation of the cam 100 and the teeth 120 relative to the cam pivot axis 15, also play a role in the strength of the grip on the webbing, as will be discussed below with reference to FIG. 7.

The actuation portion 150 of the cam 100 may have a longer span from the pivot axis 15 than the gripping portion 105 to provide a mechanical advantage for a user when pressing the releasing portion 150 to pivot the cam 100 from the secure position to the release position. A grip surface 160, such as a series of ridges and valleys, may be provided on the surface of the releasing portion 150 to form a better surface grip for the user when pressing the cam 100.

The frame 200 comprises a base 210 spanning a width of the cam 100 and two sidewalls 220 extending from opposite sides of the base 210 adjacent the sides of the cam 100. An aperture 225 is defined in each sidewall 220 coinciding with the cam pivot axis 15 for receiving and supporting the pivot pins or shaft 110 to allow the cam 100 to pivot about the cam pivot axis 15. The shaft 110 can be a fastener or rivet extending through the apertures 225 of the sidewalls 220, and the bore of the cam 100 with the free end riveted or threadedly engaged with a nut (not shown) to secure the shaft 110 and the cam 100 to the frame 200.

For use with a webbing that has a central longitudinal ridge 140 on the bottom surface, the base 210 of the frame 200 may be provided with a longitudinal frame groove 250 large enough to accommodate the bottom surface central ridge 140. That is, the frame groove 250 allows the base 210 firmly to engage both the webbing ridge 140 surrounding the cable 55 and the flat portions of the webbing 50 on either side of the ridge 140, resulting in a greater contact area than would be possible without the frame groove 250. Thus, without the frame groove 250, the only portion of the webbing in contact with the base 210 would be the ridge portion 140 of the webbing, which defines a much smaller contact area than is provided by the flat portions of the webbing 50 on either side of the ridge 140. The shape of the frame groove 250 can be semi-circular, U-shaped, V-shaped, or any other shape, provided there is sufficient clearance of the cable 55 and central ridge 140 covering the cable 55, when the cam 100 is in the secure position.

The frame groove 250 in the base 210 of the frame 200 and the cam groove 130 in the cam 100 are in lateral alignment with each other, and thus cooperatively define a longitudinal passage sufficiently large to accommodate the webbing 50, with the cable-covering ridge 140, in the secure position, thereby allowing the webbing 50 to lie flat between the base 210 of the frame 200 and the teeth 120 on the web-gripping portion 105 of the cam 100, and thereby enhancing the grip on the webbing 50.

Although it is preferable to include both a cam groove 130 and a frame groove 250, as described above, in some embodiments it may be necessary or desirable to include only one or the other. For example, the webbing 50 may accommodate the cable 55 in a way that creates a ridge 140 on only one of the two planar surfaces of the webbing. Depending on which surface, only one of the cam groove 130 and the frame groove 250 may be needed, although a cam buckle assembly with both grooves could also be employed with such a webbing. It is understood, however, that if both grooves are provided, they will be in lateral alignment with each other; that is, they are directly opposite each other on the opposite sides of the webbing.

The teeth 120 are pointed towards the base 210 of the frame to ensure that the teeth 120 are pointed directly at the webbing in at least the secure position, but they may also be angled, tilted, or slightly projecting in a direction towards the tightening direction T of the webbing 50. This allows the webbing 50 to slide more freely past the teeth 120 in the tightening direction T, and to allow the teeth 120 more readily to grab the webbing 50 when the webbing 50 is pulled in the release direction R by the operator, or by the tension of the webbing 50.

Figure 7:
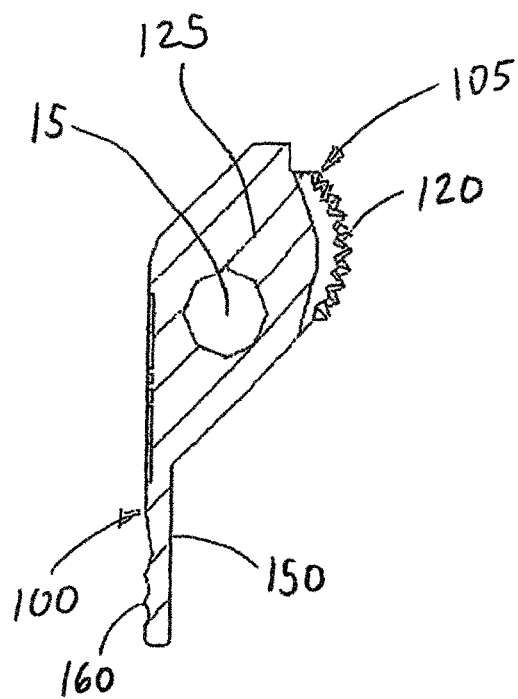
FIG. 7 shows a cross sectional view of a cam of the cam buckle assembly, the shape of the cam having a configuration designed to increase pressure on the webbing by force angle and diameter.
Figure 8:
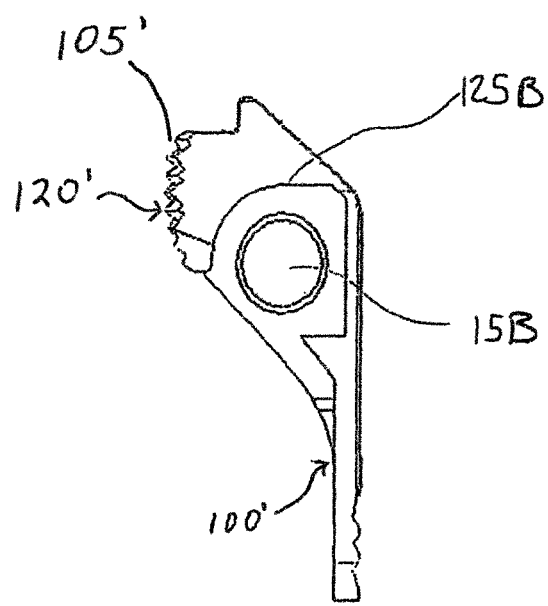
FIG. 8 shows a cross sectional view of a conventional cam.

Referring to FIGS. 7 and 8, the shape of the cam 100 can affect the pressure applied to the webbing by the teeth 120 of the cam 100, which are formed on a curved surface of the web-gripping portion 105 of the cam. FIG. 7 shows a cam 100 in accordance with the present disclosure, while FIG. 8 shows a cam 100' of conventional design, with a web-gripping portion 105' having teeth 120'. It can be seen that the web-gripping portion 105 of the cam 100 in accordance with aspects of this disclosure (FIG. 7) has a smaller radius of curvature than does the corresponding web-gripping portion 105' of the conventional cam 100' of FIG. 8. Thus, the web-gripping portion 105 of the FIG. 7 embodiment defines a radius of curvature having a center 125 that is closer both to the pivot axis 15 of the cam 100 and to the area of contact of the web-gripping portion 105 with the webbing as compared to the center 125B of the radius of curvature of the web-gripping portion 105' of the conventional embodiment of FIG. 8. Specifically, the center 125 of the radius of curvature in FIG. 7 is closer to being in alignment with the force vector between the pivot axis 15 of the cam 100 and the area of contact of the web-gripping portion 105 with the webbing than the center 125B of the radius of curvature in FIG. 8 is with the force vector between the pivot axis 15B of the cam 100' and the area of contact of the web-gripping portion 105' with the webbing. In one embodiment, the center 125 of the radius of curvature is substantially aligned with the force vector between the pivot axis 15 of the cam 100 and the area of contact of the web-gripping portion 105 with the webbing. Reducing this distance in the embodiments of this disclosure allows the pivot shaft 110 to react to the reactive force generated from the bite of the teeth 120 on the webbing 50. Said differently, the reactive force created by the rotation of the cam 100 toward the secure position, and the resulting pinch or bite on the webbing 50, is closer in line with the pivot axis 15 of the shaft 110 in the cam design of FIG. 7, than in the conventional cam design of FIG. 8. Thus, a change in the force angle and diameter of the curved cam-gripping surface 105 can increase the pressure applied to the webbing 50 by the web-gripping portion 105 and the teeth 120. Doing so, however, may affect the distance required to push the cam to the release position. This can be solved with by employing a longer actuation portion 150 (which would increase the leverage created by the actuation portion 150), or by angling the actuation portion upward to allow for greater angular travel.

Although embodiments of the cam buckle assembly and its method of use have been specifically described and illustrated herein, many modifications and variations will be apparent to those skilled in the art. Furthermore, it is understood and contemplated that features specifically discussed for one embodiment may be adopted for inclusion with another embodiment when appropriate. Accordingly, it is to be understood that the assembly, its components, and related methods constructed according to principles of the disclosed apparatus and methods may be embodied other than as specifically described herein.

What is claimed is:

1. A cam buckle assembly for use with a length of webbing in a tiedown assembly and configured for passage therethrough of the webbing in a longitudinal direction, the cam buckle assembly comprising:
   a frame having a base;
   a cam pivotably coupled along a pivot axis to the frame between a web-gripping portion and an actuation portion for movement between a secured position in which the web-gripping portion is positioned to grip the webbing against the base of the frame, and a release position in which the web-gripping portion is positioned to release the webbing from the base of the frame;
   a cam groove provided in the gripping portion of the cam and oriented along the longitudinal direction;
   a frame groove oriented along the longitudinal direction and aligned with the cam groove;
   a plurality of gripping structures on the web-gripping portion of the cam, extending laterally on opposite sides of the cam groove;
   wherein a center of a radius of curvature of the web-gripping portion is substantially aligned with the pivot axis of the cam and an area of contact of the web-gripping portion with the webbing when the webbing is passed through the cam buckle assembly.

2. A cam buckle tiedown assembly, comprising:
   a length of webbing having a metal cable extending longitudinally therethrough, the webbing having first and second surfaces, the cable being accommodated in a longitudinal channel through the webbing and defining a longitudinal ridge on at least one of the first and second surfaces; and
   a cam buckle assembly configured for passage therethrough of the webbing in a longitudinal direction, the cam buckle assembly comprising:
   a frame having a base;
   a cam pivotably coupled along a pivot axis to the frame between a web-gripping portion and an actuation portion for movement between a secured position in which the web-gripping portion is positioned to grip the webbing against the base of the frame, and a release position in which the web-gripping portion is positioned to release the webbing from the base of the frame; and
   a longitudinal groove provided in at least one of the gripping portion of the cam and the base of the frame, each longitudinal groove being configured to receive the longitudinal ridge on an adjacent one of the first and second webbing surfaces;
   wherein a center of a radius of curvature of the web-gripping portion is substantially aligned with the pivot axis of the cam and an area of contact of the web-gripping portion with the webbing when the webbing is passed through the cam buckle assembly.

3. The cam buckle tiedown assembly of claim 2, wherein the longitudinal channel of the webbing defines a first longitudinal ridge on the first webbing surface and a second longitudinal ridge on the second webbing surface, and wherein the cam buckle assembly includes a cam groove in the gripping portion of the cam configured and located to accommodate the first longitudinal ridge, and a frame groove in the base of the frame parallel to the cam groove and configured and located to accommodate the second longitudinal ridge.

4. The cam buckle tiedown assembly of claim 3, wherein the web-gripping portion of the cam includes a plurality of gripping structures extending laterally on either side of the cam groove.

5. A cam buckle assembly for use with a length of webbing in a tiedown assembly and configured for passage therethrough of the webbing in a longitudinal direction, the cam buckle assembly comprising:
   a frame having a base;
   a cam pivotably coupled along a pivot axis to the frame between a web-gripping portion and an actuation portion for movement between a secured position in which the web-gripping portion is positioned to grip the webbing against the base of the frame, and a release position in which the web-gripping portion is positioned to release the webbing from the base of the frame; and
   a plurality of gripping structures on the web-gripping portion of the cam, extending laterally on opposite sides of the cam groove;
   wherein a center of a radius of curvature of the web-gripping portion is substantially aligned with the pivot axis of the cam and an area of contact of the web-gripping portion with the webbing when the webbing is passed through the cam buckle assembly.

6. The cam buckle assembly of claim 1, wherein a longitudinal cam groove is defined in the gripping portion of the cam.

7. The cam buckle assembly of claim 5, wherein the frame defines a longitudinal frame groove laterally aligned with the cam groove.

* * * * *